Aug. 16, 1966

R. C. BUCK 3,267,281

HIGHWAY CROSSING SYSTEM

Filed Sept. 10, 1962

*INVENTOR.*
R.C.BUCK

BY Forest B. Hitchcock

HIS ATTORNEY

Aug. 16, 1966   R. C. BUCK   3,267,281
HIGHWAY CROSSING SYSTEM
Filed Sept. 10, 1962   7 Sheets-Sheet 2

FIG. 3A.

INVENTOR.
R.C. BUCK
BY
Forest S. Hitchcock
HIS ATTORNEY

Aug. 16, 1966     R. C. BUCK     3,267,281
HIGHWAY CROSSING SYSTEM
Filed Sept. 10, 1962     7 Sheets-Sheet 6

INVENTOR.
R.C. BUCK
BY
Forrest S. Hitchcock
HIS ATTORNEY

Aug. 16, 1966 R. C. BUCK 3,267,281
HIGHWAY CROSSING SYSTEM
Filed Sept. 10, 1962 7 Sheets-Sheet 7

FIG. 9.

United States Patent Office 3,267,281
Patented August 16, 1966

3,267,281
HIGHWAY CROSSING SYSTEM
Roger C. Buck, Rochester, N.Y., assignor to General Signal Corporation, a corporation of New York
Filed Sept. 10, 1962, Ser. No. 222,434
23 Claims. (Cl. 246—125)

This invention relates to highway crossing protection systems, and more particularly to a highway crossing protection system using ferrite cores to provide the logic required to operate warning signals at the crossing.

In present highway crossing systems, extensive use is made of logic relays and track relays. However, circuits using relays require periodic maintenance, inasmuch as the relays are electromechanical devices which eventually wear out without periodic servicing. Therefore, it is obviously desirable to replace such electromechanical devices with electronic solid state devices that last indefinitely due to absence of moving parts, such as ferrite cores. These cores are small, light, rugged and relatively insensitive to adverse atmospheric conditions.

The invention generally contemplates a highway crossing protection system having means for generating at least two signals indicative of the presence of a train on either side of a highway crossing. The signals are coupled to a network of multi-aperture cores which produces an output at least during the presence of the generated signals. Presence of an output from the network is detected, and then utilized for maintaining highway crossing warning lights located at the crossing in an extinguished condition.

The signal indicative of train presence may be generated from a pair of audio frequency receivers electro-magnetically coupled to the railroad track close to and on either side of the highway crossing, each receiver being tuned to receive a different frequency. Accordingly, a pair of transmitters are located at some distance from the highway crossing and apply signals of different frequencies to the railroad track, so that each receiver receives only the frequency generated on the opposite side of the highway. This is commonly known as an overlay track circuit.

A second type of system for generating signals indicative of the presence of a train on either side of a highway crossing comprises use of D.C. track circuits for producing prime signals which are coupled to the multi-aperture core network. Loss of any prime signal due to loss of track circuit current actuates logic circuitry in the multi-aperture core network for operation of the highway warning lights. Heretofore, highway crossing warning system operated in conjunction with D.C. track circuits require use of track relays for indicating condition of the rails. The present invention eliminates the need for track relays in highway crossing protection systems used in conjunction with D.C. track circuits.

One object of this invention is to provide a system for actuating highway crossing warning lights when a train approaches the crossing on a single track from either direction, through a multi-aperture ferrite core network.

Another object is to provide an electronic highway crossing warning system utilizing a minimum number of solid state passive devices for controlling the warning lights.

Another object is to provide a highway crossing warning system wherein unusual sequences of train operation at a highway crossing will not falsely cause the warning lights to be turned off.

Another object is to provide a fail-safe highway crossing protection system utilizing multi-aperture ferrite cores to perform logic functions.

Another object is to provide a highway crossing protection system utilizing multi-aperture ferrite cores in conjunction with overlay track circuits.

Another object is to provide a highway crossing protection system utilizing multi-aperture ferrite cores in conjunction with D.C. track circuits.

These and other objects and advantages of the invention will become apparent from the following detailed description when read in conjunction with the accompanying drawings in which.

Figure 1:
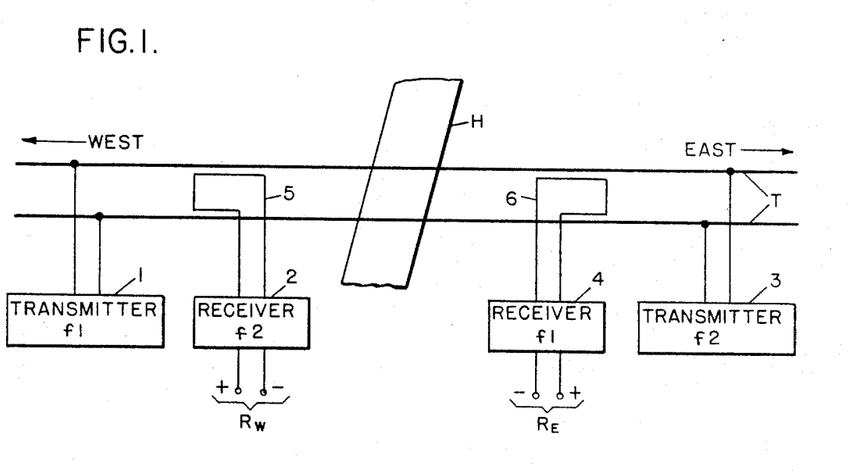
FIG. 1 is a schematic diagram showing connections and relative locations of transmitters and receivers along an overlay track circuit.

Referring now to FIG. 1 for a general description of an overlay track circuit highway crossing warning system, a railroad track T is shown intersecting a highway H. A pair of receivers, 2 and 4 are located at the west and east sides of the highway respectively. Receivers 2 and 4 are inductively coupled to the railroad track through pick-up loops 5 and 6, respectively. At greater distances from the intersection with the highway, transmitters 1 and 3 are electrically connected to the railroad track on the west and east sides of the intersection with the highway, respectively. Transmitter 1 produces a frequency $f_1$ and receiver 4 is tuned to receive only frequency $f_1$. Transmitter 3 produces a frequency $f_2$, while receiver 2 is tuned to receive only frequency $f_2$. Upon receipt of a signal of frequency $f_1$, receiver 4 produces a unidirectional output signal $R_E$, while upon receipt of a signal of frequency $f_2$, receiver 2 produces a unidirectional output signal $R_W$. Both receivers 2 and 4 produce output signals so long as no train occupies the track. However, if a train travelling in a westerly direction occupies the section of track between the connections to the rails from transmitter 3 and loop 5, receiver 2 receives no signal due to the shunting effect of the train, and therefore signal $R_W$ is not present. However, signal $R_E$ is present until the train enters the portion of the rails between loops 5 and 6, at which time signal $R_E$ is also lost, due to the shunting effect of the train. Signal $R_W$ is restored after the rear of the westbound train passes loop 5, and signal $R_E$ is restored after the rear of the train passes the connection to the rails from transmitter 1. On the other hand, if a train travelling in an easterly direction occupies the section of track between the connections to the rails from transmitter 1 and loop 6, receiver 4 receives no signal due to the shunting effect of the train, and therefore, signal $R_E$ is not present. However, signal $R_W$ is present until the train enters the portion of the rails between loops 5 and 6, at which time signal $R_W$ is also lost, due to the shunting effect of the train. Signal $R_E$ is restored after the rear of the eastbound train passes loop 6, and signal $R_W$ is restored after the rear of the train passes the connection to the rails from transmitter 3.

Figure 2A:
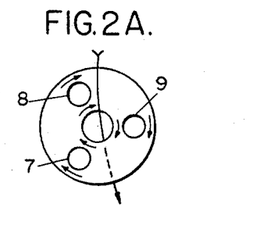
FIGS. 2A, 2B, 2C, 2D and 2E are diagrams illustrating operation of multi-aperture ferrite cores.

FIG. 2A shows the condition of a multi-aperture ferrite core in its clear or reset condition. The cores are made of square hysteresis loop ferrite material similar to ordinary memory cores. Therefore, once a flux path is set up in the core by application of a current through the core, the flux path is retained in the core until application of another current alters or reverses the existing flux paths. Thus FIG. 2A shows the flux path in a core having a major aperture and three minor apertures. Current is threaded through the major aperture in a direction illustrated by the arrow passing through the major aperture. By application of the so-called "Right-Hand Rule" for determining flux direction around a current-carrying conductor, it is seen that the core has only clockwise flux paths.

Figure 2B:
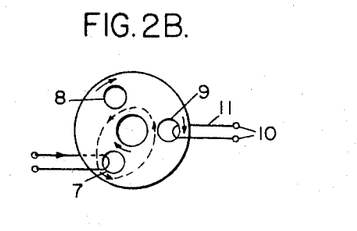

FIG. 2B shows flux paths in a cleared multi-aperture ferrite core when a minor aperture 7 is energized. If the current through minor aperture 7 flows from the rear of the aperture to the front, the dotted flux path shown in the core results. This flux path does not link output winding 11 wound through aperture 9. Thus, there is no flux reversal through the output winding, and no voltage therefore appears on output terminals 10 of winding 11. The core is now set, and may be read out from any minor aperture other than the one used to set the core.

Figure 2C:
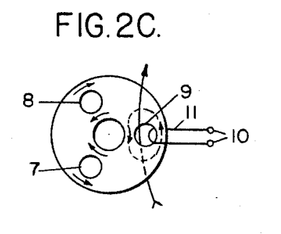

In the usual mode of operation, as shown in FIG. 2C, a long duration, low level pulse known as the prime is used to reverse flux about the output minor aperture 9 only. This flux change links the output winding but because of the low switching speed of the prime, little voltage is induced in the output. It should be noted that the prime signal may also be a direct current.

After the core has been set and primed, it may be read out by applying a clear pulse as shown in FIG. 2A. This clears the core, abruptly changing the direction of flux linking the output winding, thereby producing a pulse in the output winding which appears on output terminals 10.

Figure 2D:
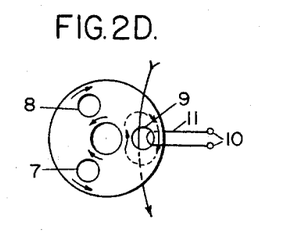

The core with flux paths as shown in FIG. 2C may be read out non-destructively as shown in FIG. 2D, by passing a pulse through minor aperture 9, thereby inducing a pulse in the output winding. The pulse passed through minor aperture 9 merely reverses the direction of flux around that aperture only, thereby reversing direction of flux linking the output winding. Minor aperture 9 may then be reprimed as shown in FIG. 2C and reread as shown in FIG. 2D, any number of times.

Figure 2E:
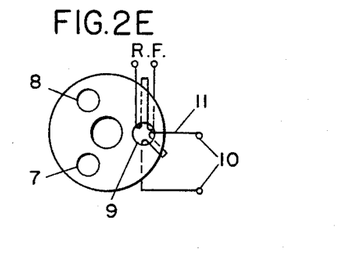

FIG. 2E illustrates use of radio frequency energy to prime and non-destructively read out aperture 9. In this case, the priming and reading pulses may be continuously applied through the same conductor, at a radio frequency rate such as 200 kilocycles. This radio frequency signal cannot switch a path around the minor aperture of a clear core, but as shown as the core is set, a radio frequency voltage is induced in the output winding which may then be used directly to light a lamp or rectified to pick up a relay.

Figure 3A:
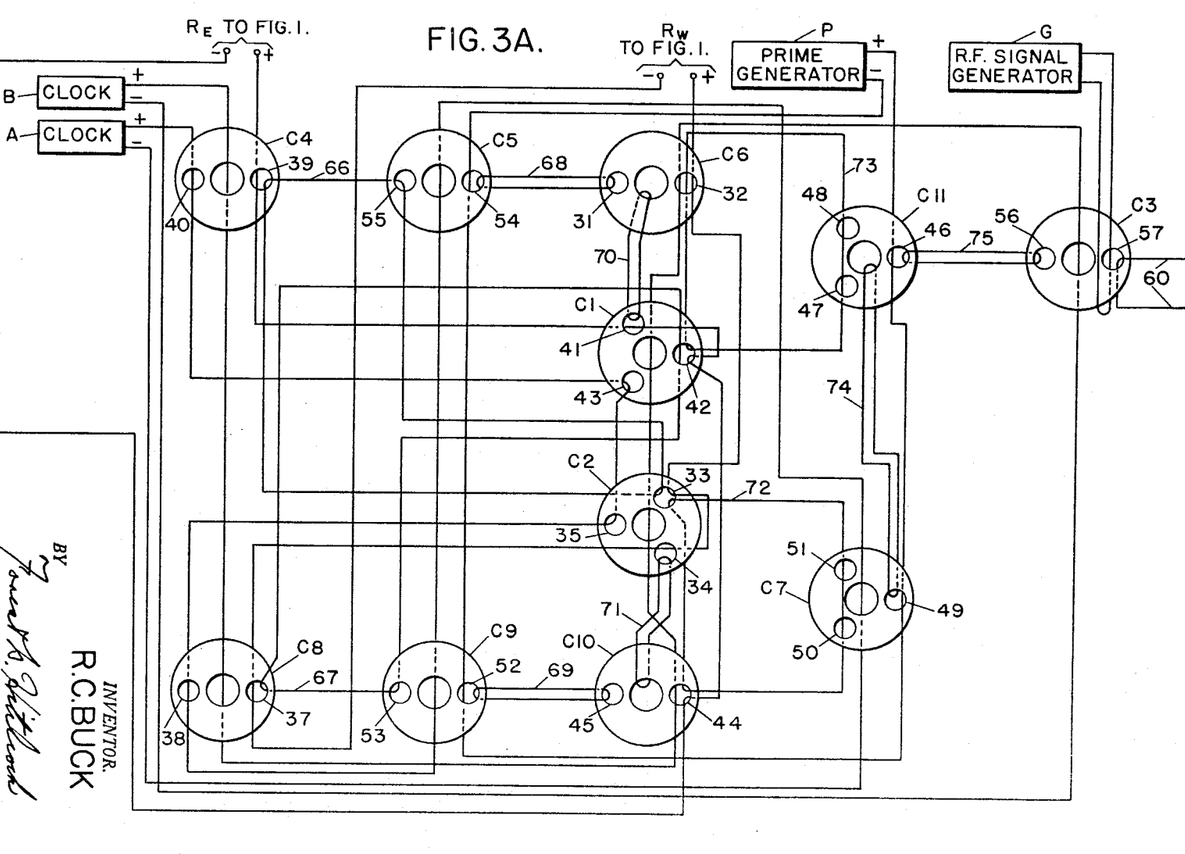
FIGS. 3A and 3B are wiring diagrams of an embodiment of the invention used in conjunction with an overlay track circuit, showing the interconnections between the various multi-aperture cores.
Figure 3B:
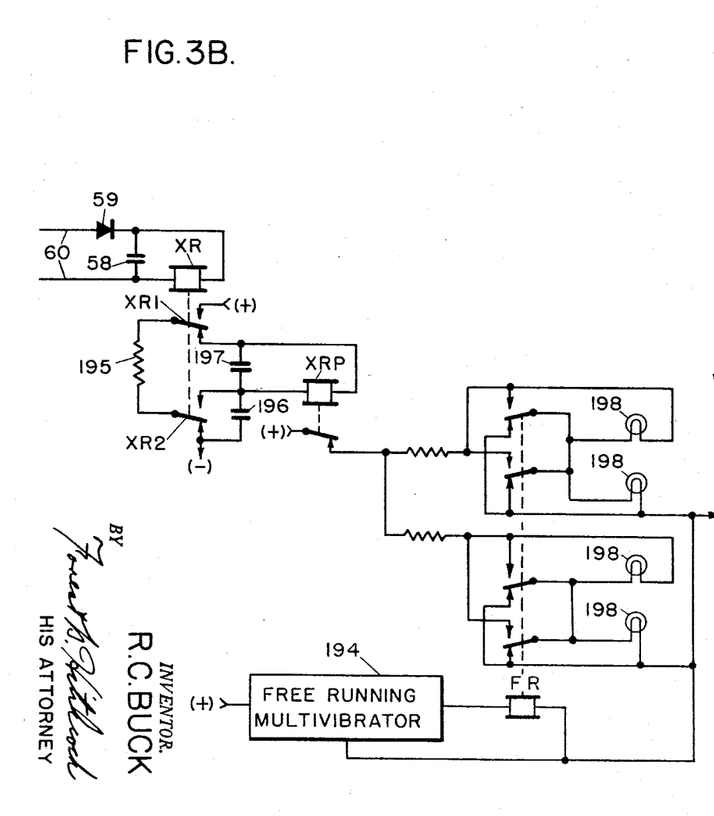

One embodiment of the present invention as shown in FIGS. 3A and 3B is designed to operate from the audio frequency approach overlay track circuits set up as shown in FIG. 1. As previously explained, in the normal condition with no trains present, both receivers 2 and 4 produce signals $R_W$ and $R_E$ respectively. As seen in FIG. 3A, signal $R_W$ is coupled through minor aperture 32 of core C6, minor apertures 33 and 34 of core C2 and minor aperture 37 of core C8. Signal $R_E$ is coupled through minor aperture 39 of core C4, minor apertures 41 and 42 of core C1, and minor aperture 44 of core C10. Thus, signal $R_W$ primes minor opertures 32, 33, 34, and 37, while signal $R_E$ primes minor apertures 39, 41, 42 and 44.

A first clock generator A produces pulses at a fixed frequency which are coupled through minor aperture 40 of core C4, minor aperture 43 of core C1, minor aperture 35 of core C2, minor aperture 38 of core C8, and the major apertures of cores C9, C5 and C7. Thus clock A sets cores C4, C1, C2 and C8, and clears cores C9, C5 and C7.

A second clock generator B produces a series of pulses at the same frequency as clock A although shifted in phase from that of clock A. The clock B pulses are coupled through the major apertures of cores C4 and C8, minor aperture 44 of core C10, the major apertures of cores C2 and C1, minor aperture 32 of core C6 and the major aperture of core C3. Thus, clock B clears cores C4, C8, C2, C1 and C3.

A prime generator P produces a series of pulses at the same frequency as that of clock A and clock B, although shifted in phase from both clocks A and B. These prime pulses are coupled through minor aperture 46 of core C11, minor aperture 49 of core C7, minor aperture 52 of core C9 and minor aperture 54 of core C5. As previously mentioned, the prime signal can be a steady direct current, rather than pulses, if so desired.

Cores C4, C5 and C2 are joined by a loop 66 threading their minor apertures 39, 55 and 33 respectively, connecting them in a half-exclusive OR circuit configuration; that is, core C4 can set core C5 only when minor aperture 33 is not primed. Cores C8, C9 and C1 are joined by a loop 67 threading their minor apertures 37, 53 and 42 respectively, connecting them in a half-exclusive OR circuit also; that is, core C8 can set core C9 only when minor aperture 42 is not primed. Cores C5 and C6 are joined by a loop 68 through their respective minor apertures 54 and 31, enabling core C5 to set core C6, while cores C9 and C10 are joined by a loop 69 through their respective minor apertures 52 and 45, thereby enabling core C9 to set core C10. Core C1 clears core C6 through a loop 70 threading minor aperture 41 of core C1 and the major aperture of core C6. Core C2 clears core C10 through a loop 71 threading minor aperture 34 of core C2 and the major aperture of core C10.

Core C7 is linked to cores C2 and C10 by a loop 72 threading minor apertures 50 and 51 of core C7 and apertures 33 and 44 of cores C2 and C10 respectively. Thus, cores C2, C10 and C7 form an exclusive OR circuit; that is, either core C2 or C10 can set core C7, but not both cores C2 and C10 simultaneously. Core C11 is linked to core C6 and C1 by a loop 73 threading minor apertures 47 and 48 of core C11 and apertures 32 and 42 of cores C6 and C1 respectively, so that cores C1, C6 and C11 also form an exclusive OR circuit; that is, either core C6 or C1 can set core C11, but not both cores C6 and C1 simultaneously.

Core C7 clears core C11 through a loop 74 threading minor aperture 49 of core C7 and the major aperture of core C11. Core C11 sets core C3 through a loop 75 threading their respective minor apertures 46 and 56. A radio frequency signal produced by RF signal generator G is coupled to core C3 through a minor aperture 57, which also comprises the output aperture of the multi-aperture core network.

Output pulses from the core network are induced by core C3 in winding 60 threaded through minor aperture 57, and are applied to a relay XR through a half-wave rectifier 59, as shown in FIG. 3B. A capacitor 58 is connected across the relay in order to smooth the core network output pulses and thereby maintain the relay energized as long as core C3 is set. The XR relay in turn controls circuits to the flashing warning lights at the crossing. In a steady deenergized or energized condition, the relay actuates the flashing lights. When the relay XR is energized, a capacitor 196 is energized from a positive voltage source through a resistor 195. When relay XR next deenergizes, back contacts XR1 and XR2 of relay XR provide a discharge path for capacitor 196 through relay XRP and resistor 195 in series. When relay XR next energizes, front contacts XR1 and XR2 of relay XR again permit charging of capacitor 196.

A capacitor 197 is connected in parallel with relay XRP to provide energy storage during the interval in which relay XR is deenergized and capacitor 196 provides energization for relay XRP. Thus, when relay XR again energizes, the energy stored on capacitor 197 maintains relay XRP in the energized condition. Should capacitor 197 lose its charge, relay XRP will deenergize. Thus, in order for relay XRP to remain energized, relay XR must continue to move. If relay XR should remain steadily energized, capacitor 197 loses its charge and relay XRP deenergized. On the other hand, should relay XR remain steadily deenergized, capacitor 196 loses its charge through relay XRP, resulting in deenergization of relay XRP.

Deenergization of relay XRP provides energization for flashing lights 198 from a positive source through back contact XRP1. Thus, relay XR must periodically be energized and deenergized in order to keep flashing lights 198 extinguished.

Flashing of the warning lights is due to constant motion of flasher relay FR. This motion is produced by energization of relay FR from a free-running multivibrator 194.

In operation, assume that track T of FIG. 1 is unoccupied. In this instance, both receivers 2 and 4 receive signals from transmitters 3 and 1, respectively. These signal frequencies are preferably within the audio range. Thus, receiver output signals $R_W$ and $R_E$, which are low level D.C. signals are both present and therefore both applied to the multi-aperture core network. Clock generators A and B which are also connected to the multi-aperture core network operate at any convenient frequency up to approximately 10 kilocycles. Cores C1 and C2 are set by clock A and primed by signals $R_E$ and $R_W$ respectively. Clock B which produces a pulse after clock A, clears both cores C1 and C2, thereby setting cores C11 and C7 respectively, through their respective minor apertures 47 and 51, by producing an output current in loops 72 and 73.

Figure 4:
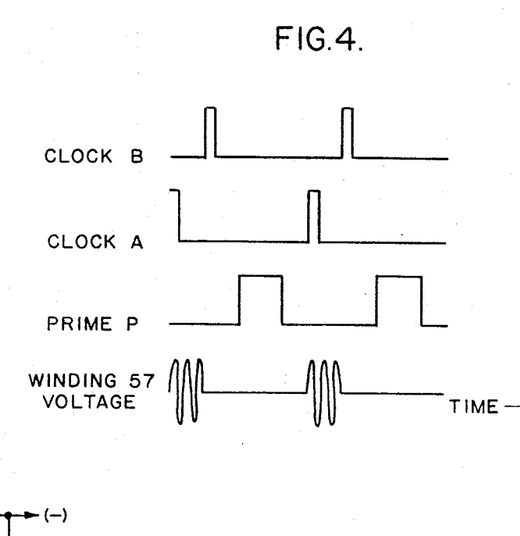
FIG. 4 is a graphical illustration of the sequence in which pulses are applied to the various embodiments of the invention.

FIG. 4 illustrates pulse sequences. A pulse from prime generator P occurs after occurrence of a pulse from clock B. This prime pulse primes cores C11, C7, C9 and C5 through their respective minor apertures 46, 49, 52 and 54. Following the prime pulse, another pulse is generated by clock A which clears core C7, thereby producing an output which clears core C11. Upon clearing, core C11 sets core C3, enabling the radio frequency readout signal coupled through minor aperture 57 of core C3 to pulse output winding 60 and thereby energize relay XR. Upon occurrence of the next clock B pulse, core C3 is cleared and relay XR thereby deenergizes. As previously explained, periodic energization and deenergization of relay XR keeps the flashing warning lights extinguished, permitting vehicles to cross the track at the highway crossing.

Output winding 60 is therefore pulsed at a radio frequency rate only during the time interval between clock A and clock B pulses. This interval can be adjusted to any convenient portion of the total cycle.

If signal $R_E$ disappears, core C6 is not set because core C5 is not set by core C4; also, core C1 is not primed. Therefore, core C11 cannot be set by loop 73, and a pulse from core C7 thus results in no output from core C11 and steady deenergization of relay XR.

On the other hand, if signal $R_W$ disappears, core C10 is not set because core C9 is not set by core C8; also, core C2 is not primed. Therefore core C7 cannot be set by loop 72 and hence core C11 cannot be cleared by a pulse from core C7, again resulting in no output from core C11 and steady deenergization of relay XR.

Assume now that an eastbound train is travelling on track T of FIG. 1. In this instance, it is desirable to extinguish the warning lights as soon as the train has passed entirely beyond the crossing to avoid unnecessary blocking of the highway. As the train approaches from the west, it shunts the output of transmitter 1, causing receiver 4 to receive no signal. As soon as receiver 4 receives no signal in its pick-up loop 6, signal $R_E$ disappears and relay XR is steadily deenergized, turning on the warning lights. Core C9 is set by a pulse from core C8 passing through loop 67, upon application of a clock B pulse.

Cores C8, C9, and C1 are connected to form a half-exclusive OR circuit, as previously mentioned. Thus, loop 67 is wound through output minor aperture 37 of core C8 in a direction to set core C9, and through output minor aperture 42 of core C1 so as to oppose the output of core C8 when minor aperture 42 is primed. Both cores C1 and C8 are set every clock cycle by the pulse from clock A, and primed by signals $R_E$ and $R_W$ respectively. Hence, when signal $R_E$ disappears, minor aperture 42 is no longer primed, the output pulses from core C8 are therefore no longer opposed by core C1, and core C9 is thereby set upon application of a clock B pulse. Core C9 is primed from prime generator P and upon being cleared by a pulse from clock A, produces a pulse which sets core C10. Core C10 is not primed however, because signal $R_E$ is absent; it is cleared by a pulse from core C2 when a clock B pulse is produced.

Cores C2, C10 and C7 are connected to form an exclusive OR circuit, as previously mentioned. Thus, a pulse produced by core C2 upon occurrence of a clock B clear pulse sets core C7 through minor aperture 51. However, core C11 is not set because absence of signal $R_E$ prevents priming of core C1. Thus, relay XR remains steadily deenergized and the warning signals remain on.

When the train reaches the crossing, it shunts the signal which otherwise would be picked up by loop 5, shown in FIG. 1. This causes disappearance of signal $R_W$. Core C10 can therefore no longer be cleared by core C2 because minor aperture 34 is no longer primed, and core C9 can no longer be set by core C8 because minor aperture 37 is no longer primed. It should be noted that core C10 is set at least once after the last clear pulse from core C2 because core C9 is set. However, since there is no prime for core C10, core C7 cannot be set.

When the rear end of the train passes beyond the crossing so that loop 6 is no longer shunted by the train, receiver 4 once again receives signal $f_1$ and signal $R_E$ reappears, providing the prime for core C10, which is then read out non-destructively by the pulse from clock B passing through minor aperture 44. This provides a set pulse for minor aperture 50 of core C7 in the absence of signal $R_W$. Core C7 is primed by prime generator P and read out by the pulse from clock A. The pulse read from core C7 clears core C11 which has previously been set through minor aperture 47 by a pulse from core C1. Thus, core C3 is set by core C11, non-destructively read out by a radio frequency signal threading minor aperture 57, and cleared by clock B. Hence relay XR becomes periodically energized while the train still shunts the signal from transmitter 3, extinguishing the warning lights.

When the train leaves and transmitter 3 no longer is shunted, signal $R_W$ reappears, and core C10 is cleared by core C2. If core C10 should fail to clear, pulses are produced from minor aperture 44 of core C10 simultaneously with and in opposition to pulses from minor aperture 33 of core C2, thereby preventing core C7 from becoming set. Relay XR deenergizes steadily again, making the failure self-detecting.

Operation of the circuit is similar in the case of westbound trains, although cores C2, C4, C5 and C6 detect the sequence rather than C1, C8, C9 and C10. Thus, as the train approaches from the east, it shunts the output of transmitter 3, causing receiver 2 to receive no signal. As soon as receiver 2 receives no signal in its pickup loop 5, signal $R_W$ disappears and relay XR is steadily deenergized, turning on the warning lights. Core C5 is then set by a pulse from core C4 passing through loop 66 upon application of a clock B pulse. This is because cores C4, C5 and C2 are connected to form a half-exclusive OR circuit, as previously mentioned. Thus, loop 66 is wound through minor aperture 39 of core C4 in a direction to set core C5, and through output minor aperture 33 of core C2 so as to oppose the output of core C4 when minor aperture 33 is primed. Both cores C2 and C4 are set every clock cycle by the pulse from clock A and primed by signals $R_W$ and $R_E$, respectively. Hence, when signal $R_W$ disappears, output pulses from core C4 are no longer opposed by core C2, and core C5 is thereby set upon application of a clock B pulse. Core C5 is primed from prime generator P and upon being cleared by a pulse from clock A, produces a pulse which sets core C6. Core C6 is not primed because signal $R_W$ is absent; it is cleared by a pulse from core C1 when a clock B pulse is produced.

Cores C1, C6 and C11 are connected to form an exclusive OR circuit as previously mentioned. Thus, a pulse produced by core C1 upon occurrence of a clock B clear pulse sets core C11 through minor aperture 47. However, core C7 is not set because absence of signal $R_W$ prevents priming of core C2, and core C11 cannot therefore be cleared. Thus, relay XR remains deenergized and the warning lights remain on.

When the train reaches the crossing, it shunts the signal which otherwise would be picked up by loop 6 shown in FIG. 1. This causes disappearance of signal $R_E$. Core C6 can therefore no longer be cleared by core C1 because minor aperture 41 is no longer primed, and core C5 can no longer be set by core C4 because minor aperture 39 is no longer primed. It should be noted that core C6 is set at least once after the last clear pulse from core C1, because core C5 is set. However, since there is no prime for core C6, core C11 cannot be set.

When the rear end of the train passes beyond the crossing so that loop 5 is no longer shunted by the train, receiver 2 once again receives signal $f_2$ and signal $R_W$ reappears, providing the prime for core C6 which is then read out non-destructively by the pulse from clock B passing through minor aperture 32. This provides a set pulse for minor aperture 48 of core C11 in the absence of signal $R_E$. Signal $R_W$ also provides the prime for minor aperture 33 of core C2 which is cleared by clock B thereby setting core C7 through its minor aperture 51. Core C7 then provides a clear pulse for core C11, enabling core C3 to be set, thereby energizing relay XR as previously explained. Thus, the relay is periodically energized and the warning lights thereby extinguished while the train shunts out signal $f_1$ preventing receiver 4 from producing signal $R_E$.

When the train leaves and transmitter 1 is no longer shunted, signal $R_E$ reappears and core C6 is cleared by core C1. If core C6 should fail to clear, pulses are produced from minor aperture 32 of core C6 simultaneously with and in opposition to pulses from minor aperture 42 of core C1, thereby preventing core C11 from becoming set. Relay XR deenergizes steadily again, making this failure self-detecting.

Unusual sequences, such as a train backing off the approach circuit, or blocking the crossing and then backing off the crossing, cannot produce false periodic energization to relay XR. Moreover, any wire or core breakage or any cross between two wires or turns of a single winding results either in immediate start of the crossing protection, or failure to stop the crossing protection after the train has passed. Failure of either clock generator results in either steady energization or steady deenergization of relay XR, whether the generator becomes open circuited or produces steady energy. Therefore the system is fail-safe.

Pulses from the prime generator must be kept below a certain level of amplitude in order to prevent undesired setting of cores C11 and C7 by the prime pulses, resulting in outputs when pulses are produced by clock A. Because steady D.C. priming makes it easier to guarantee this condition, a D.C. prime signal may actually be preferable to use of unidirectional prime pulses in this circuit.

Figure 5:
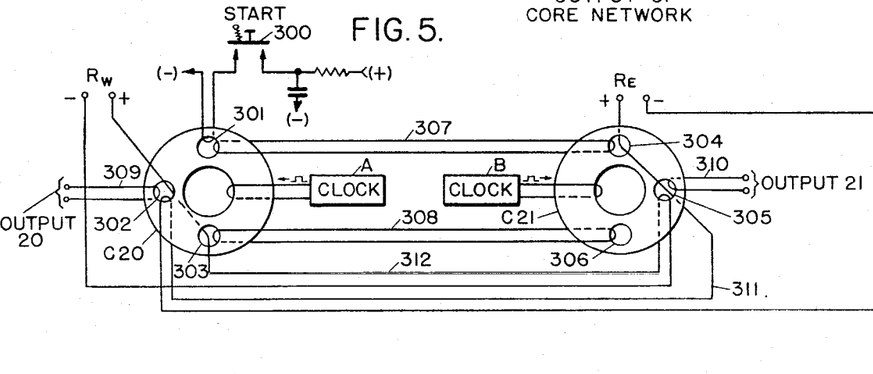
FIG. 5 is a wiring diagram of a recirculation circuit used in second and third embodiments of the highway crossing warning system.

Turning now to FIG. 5, there is shown a recirculating circuit wherein a set pulse applied to a first multi-aperture core is recirculated from the first core to a second multi-aperture core, back to the first core, and so on, until loss of a prime signal occurs. The set voltage will hereinafter also be referred to as a binary ONE. Loss of a prime signal at either core causes an output consisting of a binary ONE at the core losing the prime.

Assume cores C20 and C21 are connected by loops 307 and 308 threading minor apertures 301 of core C20 and 304 of core C21 respectively, and minor apertures 303 of core C20 and 306 of core C21, respectively. An output winding 309 is wound through minor aperture 302 of core C20 and produces output 20 while an output winding 310 is wound through minor aperture 305 of core C21 and produces output 21. Pulses from clock A thread the major aperture of core C20. Conductor 312 connects to receiver 2 of FIG. 1 and threads signal $R_W$ from receiver 2 of FIG. 1 through minor apertures 302 and 303 of core C20 and minor aperture 305 of core C21. Conductor 311 connects to receiver 4 of FIG. 1 and threads signal $R_E$ from receiver 4 of FIG. 1 through minor apertures 304 and 305 of core C21 and minor aperture 302 of core C20. A start push button 300 is connected to momentarily thread a set pulse or ONE through minor aperture 301 of core C20.

In operation of the recirculating circuit, assume cores C20 and C21 are receiving clear pulses from clocks A and B respectively. Assume also that Start push button 300 is momentarily operated to thread a ONE through minor aperture 301 of core C20. This sets core C20. Assuming no train is present on track T of FIG. 1, signals $R_E$ and $R_W$ are both present. Signal $R_W$ primes minor aperture 303 of core C20, while signal $R_E$ primes minor aperture 304 of core 21. Because signals $R_E$ and $R_W$ flow in opposite directions through minor aperture 302 of core C20 and minor aperture 305 of core C21, they cancel each other therein; therefore minor apertures 302 and 305 are not primed. Hence, upon application of a clock A pulse a ONE is produced in loop 308 and is coupled through minor aperture 306 of core C21, thereby setting core C21. When a pulse is next generated by clock B, in the sequence illustrated in FIG. 4, core C21 is cleared, producing a ONE on loop 307 which is coupled through minor aperture 301 of core C20, thereby setting core C20. This in turn causes production of a ONE on winding 308 which sets core C21 upon the next core A pulse, and so on.

Now assume an eastbound train is travelling on track T of FIG. 1. As previously explained, signal $R_E$ will first disappear. Thus, minor aperture 304 of core C21 loses its prime and core C20 therefore can no longer be set by core C21. The $R_W$ current from receiver 2 of FIG. 1 flows in a direction so as not to prime core C20 through minor aperture 302 but to prime core C21 through minor aperture 305. Thus when a ONE is coupled from core C20 to core C21, it has the effect of producing a ONE on output winding 310 when core C21 is next cleared by clock B. Therefore, loss of signal $R_E$ produces output 21. Because minor aperture 304 is no longer primed, no voltage is produced in loop 307. Thus, in order to recirculate a new ONE, start push button 312 must again be momentarily depressed to produce a new set pulse in core C20.

In like manner, loss of signal $R_W$ produces a ONE on winding 309 threading core C20 and also halts recirculation of the ONE between cores C20 and C21. Again, to resume recirculation of a new ONE between cores, push button 312 must again be momentarily depressed.

Thus, assuming travel of an eastbound train on track T of FIG. 1, loss of signal $R_E$ produces output 21 and recirculation of a ONE between the cores cannot be resumed until the train has passed east of transmitter 3. This is because presence of both signals $R_E$ and $R_W$ are necessary for recirculation of the pulse as previously explained. Likewise, assuming travel of a westbound train on track T, loss of signal $R_W$ produces output 20, and recirculation of a ONE between the cores cannot be resumed until the train has passed west of transmitter 1.

Figure 6:
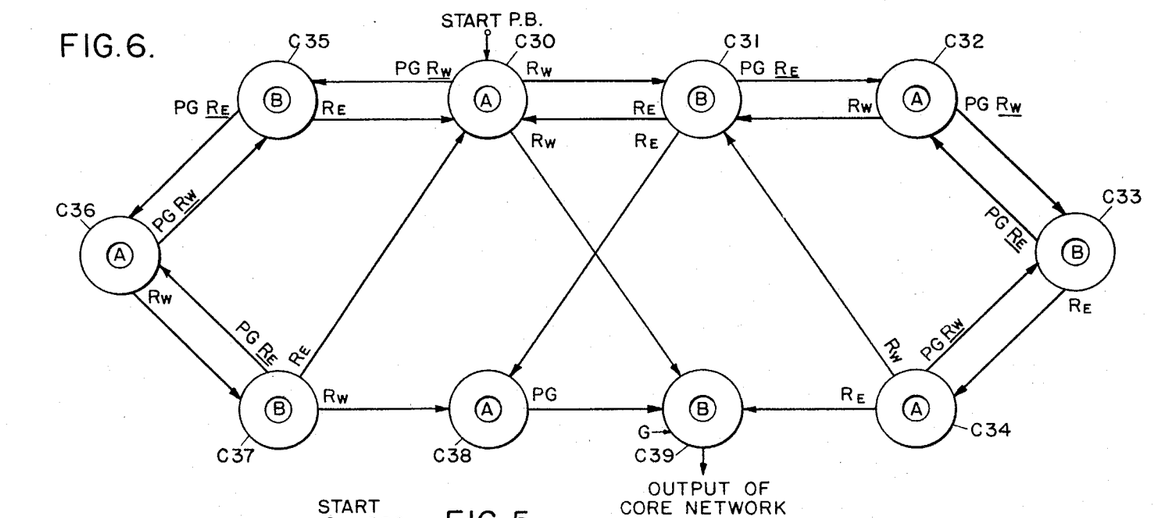
FIG. 6 is a functional diagram of the second embodiment of the highway crossing warning system for use in conjunction with an overlay track circuit.

Turning next to FIG. 6, there is functionally shown a second embodiment of a highway crossing protection system utilizing ferrite cores for providing the necessary logic to operate warning signals at the crossing. This system, like that of FIG. 3, is intended for use with an overlay track circuit as shown in FIG. 1. The circuit incorporates a number of recirculating circuits similar in configuration to those shown in FIG. 5. In this circuit, as in that of FIG. 3, signals $R_E$ and $R_W$ represent the D.C. prime currents produced by track circuit receivers 4 and 2, respectively, of FIG. 1. The prime generator PG used in this circuit provides a continuous direct current. Furthermore, clock A and clock B pulses are produced in this embodiment by the flasher relay FR of the highway crossing warning lights, which is operated continuously. Clock A and clock B pulses are coupled through the major apertures of the cores as indicated in FIG. 6. Thus, the letter A in a major aperture indicates that a clock A pulse is threaded through that aperture while the letter B in a major aperture indicates that a clock B pulse is threaded through that major aperture. The windings to the major aperture are not shown for purposes of clarity. Furthermore, only the coupling loops are shown, and in FIG. 6 they are llustrated by arrows indicating the direction of travel of a ONE. In addition, prime signals for a minor aperture are indicated alongside the aperture. Thus, the symbol PG adjacent to a minor aperture indicates that a winding from prime generator PG, not shown, is wound through that minor aperture, and the symbol $R_E$ or $R_W$ adjacent to a minor aperture indicates that such signal is threaded through the associated minor aperture. If the prime signal is underlined, it indicates that the prime winding is wound in the opposite sense, tending to inhibit priming of the aperture. Hence, the symbol $R_E R_W$ means that the associated aperture is primed only when signal $R_E$ is present and signal $R_W$ is absent. This system of notation is used to simplify the drawings.

Briefly, operation of this system is as follows: Assume there are no trains on track T of FIG. 1. If the Start push button is now depressed, a ONE is introduced into core C30, setting that core. The first clock A pulse after core C30 is set causes core C31 to be set by core C30. The next clock B pulse causes core C30 to be set by core C31. It should be noted that the clock A and clock B pulses used in this circuit occur in the same sequence as illustrated in FIG. 4. Thus, the ONE is recirculated between cores C30 and C31 in a manner similar to that described for FIG. 5. In addition, on clock A pulses, core C30 sets core C39, and on clock B pulses, core C31 sets core C38. Thus, on clock A pulses core C39 is set and on clock B pulses core C38 is set. It should also be noted that on clock A pulses core C34 can set core C39 and on clock B pulses core C37 can set core C38.

If an eastbound train arrives, causing signal $R_E$ to disappear, the next clock B pulse does not set cores C30 and C38, but instead sets core C32. Thus, the ONE is transferred to core C32 then back to core C31 and so on, until the train arrives at the crossing, causing signal $R_W$ to disappear. Since the ONE is no longer recirculating between cores C30 and C31, no output is produced from core C39, and the warning lights are turned on through the circuit of FIG. 10 infra.

When signal $R_W$ disappears due to shunting of pickup loop 5 by the eastbound train in FIG. 1, the ONE is transferred to core C33 upon the next clock A pulse, and recirculated between cores C32 and C33 until the train passes entirely beyond the crossing and signal $R_E$ reappears.

Upon reappearance of signal $R_E$, the ONE is transferred to core C34 upon the next clock B pulse, and recirculates between cores C33 and C34. On each A phase of the clock cycle, core C34 sets core C39, resulting in an output from core C39. This output is produced by a radio frequency signal coupled to core C39 from a generator G. Output of the core network then extinguishes the warning lights through the circuit of FIG. 10.

When the eastbound train leaves the vicinity of transmitter 3 of FIG. 1, signal $R_W$ reappears, causing transfer of the ONE to core C31 from core C34 on the next clock A pulse. The ONE thus recirculates between cores C31 and C30 again, until another train arrives.

In the case of a westbound train, loss of signal $R_W$ causes recirculation of the ONE between cores C30 and C31 to cease, and causes recirculation of the ONE between cores C30 and C35. Clock A pulses no longer set core C39 after loss of signal $R_W$ and thus output of core 39 ceases upon loss of signal $R_W$, turning on the warning lights in a manner to be described, infra.

When the train arrives at the crossing, signal $R_E$ disappears, and the ONE is now recirculated between cores C35 and C36. The warning lights remain on.

When the train passes entirely beyond the crossing, signal $R_W$ reappears, causing recirculation of the ONE between cores C36 and C37. On each clock B pulse after resumption of signal $R_W$, core C38 is set by core C37, which in turn sets core C39 on each clock A pulse, causing output of the core network to resume. The warning lights are thus extinguished.

When the westbound train leaves the vicinity of transmitter 1, reappearance of signal $R_E$ transfers the ONE to core C30 from core C37 on the next clock A pulse. The ONE then recirculates between cores C30 and C31 again, until another train arrives.

Some examples of the fail-safe nature of the core network may be illustrated by the following examples. Should a train approach the crossing from the west, dropping signal $R_E$, and then back off, the ONE will be shifted back from core C32 to core C31 on the first clock B pulse, causing resumption of core network output, thereby turning off the warning lights. In another instance, if an eastbound train moves onto the crossing, eliminating both signals $R_E$ and $R_W$, and then backs off so that signal $R_W$ reappears before signal $R_E$, the ONE which is recirculating between cores C32 and C33 is transferred back to core C31 and recirculates between cores C31 and C32 upon resumption of signal $R_W$. The ONE is not recirculated between cores C30 and C31 until signal $R_E$ reappears. Upon reappearance of signal $R_E$, the warning lights are turned off, since core C30 now sets core C39 on each clock A pulse, causing resumption of core network output.

Opening or shortening of any coupling loop results in failure to transfer, eventually resulting in failure of the warning lights to shut off; in case of an open or short circuit in the loops between cores C30 and C31, immediate starting of the lights results. Loss of any of three priming sources also results in either immediate or eventual flashing of the warning lights when they normally would be off. Loss of any clear winding results in immediate flashing of the lights, unless such loss is due to failure of the flasher relay which generates the clear pulses, in which case the warning lights will be on although not flashing. The latter condition is discussed in further detail in connection with FIG. 10.

If an eastbound train passes the crossing, permitting signal $R_E$ to resume, and then backs onto the crossing, signal $R_E$ disappears, and the ONE which has been recirculating between cores C33 and C34 reverts back to recirculating between cores C33 and C32. If the train then backs further so that signal $R_W$ resumes, the ONE recirculates between cores C31 and C32, and when the train backs further so that signal $R_E$ resumes, output of core C39 resumes, extinguishing the warning lights.

Figure 7:
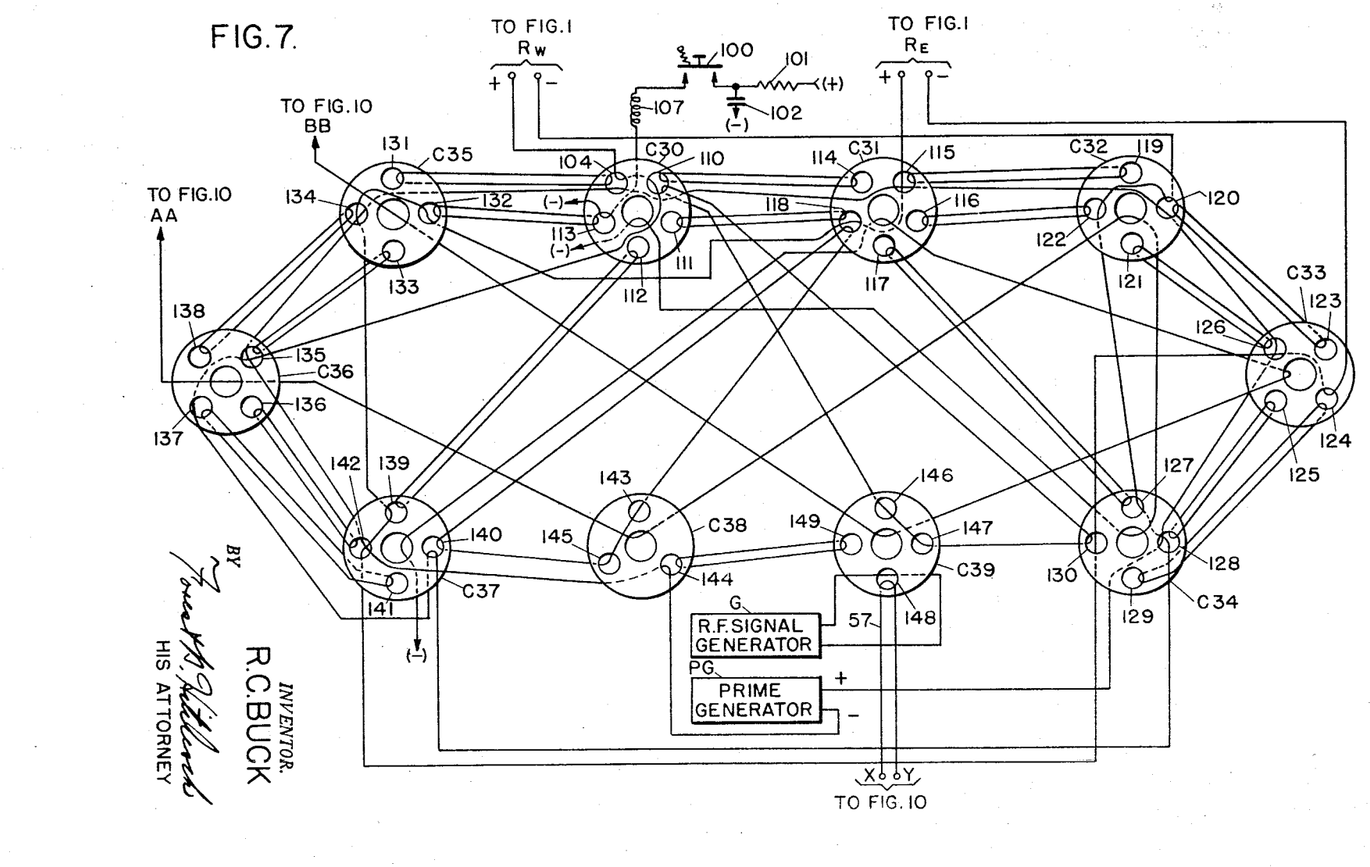
FIG. 7 is a wiring diagram of the second embodiment of the highway crossing warning system, showing interconnections between the various multi-aperture cores.

Turning now to FIG. 7 for a more detailed description of the second embodiment of the overlay track circuit highway crossing warning system, a Start push button 100 is connected to apply a set pulse to minor aperture 113 of core C30 from a positive source. The pulse is taken from a point common to a resistor and capacitor connected across a direct current source. Use of resistor 101 and capacitor 102 provides a large amplitude pulse for setting core C30 when Start push button 100 is momentarily depressed.

Figure 10:
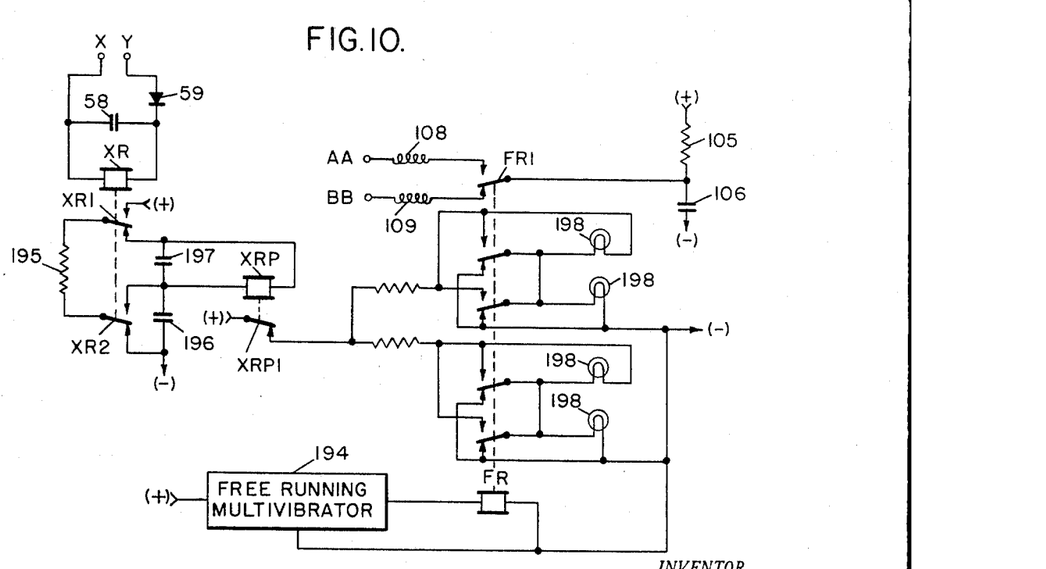
FIG. 10 is a wiring diagram of the controls for the flashing warning lights operated by the embodiments of FIGS. 7 and 9.

Conductors AA and BB providing clock A and clock B pulses are connected to contact FR1 of flasher relay FR, shown in FIG. 10. Contact FR1 is supplied from a point common to resistor 105 and capacitor 106 connected across a direct current supply. This RC circuit performs a function similar to the RC circuit comprising resistor 101 and capacitor 102.

Addition of a radio frequency choke 107 may be desirable in the Start push button circuit in order to increase the rise time for the ONE applied to minor aperture 113 of core C30. Likewise, a pair of radio frequency chokes 108 and 109 may be inserted in the clock A and clock B leads, in order to increase the rise time for the clock A and clock B pulses in a manner similar to that provided by choke 107. Chokes 108 and 109 are shown connected in the circuit of FIG. 10.

Cores C30, C39, and C34 are connected in an exclusive OR circuit configuration. Thus, minor aperture 146 of core C39 can be set from minor aperture 130 of core C34, or minor aperture 147 of core C39 can be set from minor aperture 110 of core C30, upon occurrence of a clock A pulse. However, core C39 cannot be set from cores C34 and C30 simultaneously, since simultaneous pulses from cores C34 and C30 would cancel in core C39. Cores C37, C38 and C31 also are connected in an exclusive OR circuit. Thus, minor aperture 143 of core C38 may be set from minor aperture 140 of core C37, and minor aperture 145 of core C38 may be set from minor aperture 118 of core C31 upon occurrence of a clock B pulse, although core C38 cannot be set from cores C37 and C31 simultaneously, since simultaneous pulses from cores C37 and C31 would cancel in core C38. When core C38 is set, a clock A pulse causes minor aperture 149 of core C39 to be set from minor aperture 144 of core C38.

A prime generator PG, which in this circuit produces steady direct current, provides a prime signal for one minor aperture in every core except core C39, to facilitate transfer of the ONE. A radio frequency signal generator G is connected through minor aperture 148 of core C39, providing a prime and non-destructive readout signal for the core during the interval following the clock A pulse and preceding the clock B pulse. Output voltage on winding 57 threading core C39 through minor aperture 148 is illustrated in FIG. 4 along with the sequence of clock A and clock B pulses. However, in this instance, the prime signal is steady direct current, although it could be direct current pulses as illustrated by the prime pulses of FIG. 4 and produced by prime generator P of FIG. 3.

It should be noted that flasher relay FR of FIG. 10 provides A and B pulses through its contact FR1 because it remains constantly in motion. This is the result of energization of relay FR from free-running multivibrator 194, shown in FIG. 10.

To operate the core network, Start push button 100 must first be momentarily depressed. This push button is preferably physically located at the highway crossing utilizing this network. Assuming first that no train is present on track T of FIG. 1, core C30 is set through minor aperture 113, and the first clock A pulse sets core C31 through minor aperture 114. The next clock B pulse sets core C30 through minor aperture 111, and the ONE is recirculated between cores C30 and C31. Upon occurrence of clock A pulses, core C30 sets core C39 through minor aperture 147, and upon occurrence of clock B pulses, core C31 sets core C38 through minor aperture 145. During the interval in which core C39 is set, radio frequency signal generator G primes and non-destructively reads out pulses from core C39, energizing relay XR. Upon occurrence of clock B pulses, core C39 is cleared, and output on winding 57 ceases, deenergizing relay XR. Thus, relay XR is periodically energized and deenergized. As will be explained in connection with FIG. 10 relay XRP of FIG. 10 is energized only when relay XR is periodically energizing and deenergizing. This feature provides protection against opening of the clock B circuit while core C39 is set, leaving relay XR permanently energized. Thus, the circuit is made failsafe against every conceivable failure in the core network.

Now assume an eastbound train on track T of FIG. 1 approaches the highway crossing. As previously explained, signal $R_E$ first disappears. The next clock B pulse can cause neither core C30 nor core C38 to become set, since no prime signal exists through minor aperture 118 of core C31. However, core C32 is set from minor aperture 115 of core C31, since loss of signal $R_E$ permits priming of minor aperture 115 by signal PG. Thus, upon occurrence of a clock B pulse, a ONE is transferred from minor aperture 115 to minor aperture 119 of core C32, and upon the next clock A pulse, the ONE is transferred back to core C31 through minor aperture 116. The ONE is thus transferred back and forth between cores C31 and C32 until the eastbound train arrives at the crossing, eliminating signal $R_W$. It should here be noted that since core C39 cannot be set from core C30 due to absence of a priming signal for minor aperture 118 of core C31, and that since core C39 cannot be set from minor aperture 130 of core C34 because core C34 itself cannot be set from minor aperture 124 of core C33 due to lack of a prime signal through minor aperture 124, no output signal is produced on winding 57 from core C39, and relay XR is deenergized. The flashing warning lights are thereby turned on.

When signal $R_W$ disappears, a set pulse is transferred from minor aperture 120 of core C32 to minor aperture 123 of core C33 upon occurrence of a clock A pulse, since minor aperture 120 is primed by the prime generator at the loss of opposing signal $R_W$. Upon occurrence of the next clock B pulse, a set pulse is transferred from minor aperture 126 of core C33 to minor aperture 121 of core C32, since minor aperture 126 is primed by the prime generator due to absence of opposing signal $R_E$. Thus, set pulses are recirculated between cores C33 and C32 until the eastbound train passes entirely beyond the crossing and signal $R_E$ thereupon reappears.

Reappearance of signal $R_E$ prevents priming of minor aperture 126 in core C33, and upon occurrence of the next clock B pulse, a set pulse is transferred to minor aperture 129 of core C34 from minor aperture 124 of core C33, which becomes primed upon resumption of signal $R_E$. Minor aperture 128 of core C34 is primed by the prime generator due to absence of opposing signal $R_W$. Thus, upon occurrence of a clock A pulse, a set pulse is transferred from minor aperture 128 of core C34 to minor aperture 125 of core C33, and upon occurrence of the next clock B pulse, a set pulse is transferred back to core C34 and so on. Resumption of signal $R_E$ also primes minor aperture 130 of core C34, so that upon occurrence of clock A pulses, minor aperture 147 of core C39 is set by core C34. Setting of core C39 results once again in relay XR alternately energizing and deenergizing, thereby energizing relay XRP of FIG. 10 and extinguishing the flashing lights.

After the eastbound train passes to the east of transmitter 3, signal RW resumes as previously explained. On the next clock A pulse following resumption of signal $R_W$, a set pulse is no longer transferred from minor aperture 128 of core C34 to core C33 because presence of signal $R_W$ cancels the prime of minor aperture 128 produced by the prime generator. However, minor aperture 127 of core C34 is primed due to resumption of signal $R_W$, and thus, occurrence of the clock A pulse transfers a set pulse from minor aperture of core C34 to minor aperture 117 of core C31. This resets core C31, so that upon occurrence of the next clock B pulse, a set pulse is produced from minor aperture 118 of core C31 and applied to minor aperture 111 of core C30, and then recirculated back to core C31 upon occurrence of the next clock A pulse, and so on until another train arrives.

In the case of westbound trains, the circuit operates in similar fashion. In this instance, signal $R_W$ disappears prior to disappearance of signal $R_E$. Thus, a recirculating ONE travelling between cores C30 and C31, upon loss of signal $R_W$, is coupled to minor aperture 131 of core C35 from minor aperture 104 of core C30 upon occurrence of the first clock A pulse following loss of signal $R_W$. This is due to priming of minor aperture 104 by the prime generator caused by loss of opposing signal $R_W$. The ONE is then recirculated between cores C30 and C35 in a manner similar to that described for recirculation of pulse between cores C31 and C32 in conjunction with loss of signal $R_E$ in the case of an eastbound train.

Subsequent loss of signal $R_E$ causes transfer of the ONE upon occurrence of the next clock A pulse from minor aperture 134 of core C35 to minor aperture 138 of core C36. The ONE is then recirculated from minor aperture 135 of core C36 to minor aperture 133 of core C35 upon occurrence of a clock A pulse, recirculated back to core C36 upon occurrence of a clock B pulse, and so on.

Upon resumption of signal $R_W$, minor aperture 137 of core C36 is primed, and upon occurrence of the next clock A pulse, a ONE is transmitted to minor aperture 141 of core C37. Upon occurrence of the following clock B pulse, minor aperture 142 of core C37 which is primed by the prime generator upon absence of opposing signal $R_E$ transmits a set pulse to minor aperture 136 of core C36, and upon occurrence of the next clock A pulse, the ONE is recirculated back to core C37 and so on. Each time core C37 is set through minor aperture 141, and cleared by clock B, an output pulse is produced from minor aperture 140 of core C37, which sets core C38 through minor aperture 143. Upon the next clock A pulse, minor aperture 149 of core C39 is set from minor aperture 144 of core C38, and the flashing warning lights are extinguished.

Finally, upon resumption of signal $R_E$, minor aperture 139 of core C37 is primed, and upon occurrence of the next clock B pulse, core C30 is set through minor aperture 112. The next clock A pulse causes a ONE to be transferred to core C31 and upon occurrence of the next clock B pulse the ONE is transferred back to core C30, and so on. The warning lights thus remain off, and the circuit is ready to again actuate the warning lights upon approach of a train from either direction.

The exclusive OR circuits formed by cores C37, C38 and C31, and by cores C30, C39 and C34, provide additional protection in that should a core become set due to an abnormal condition such as might be caused by lightning, and an extra ONE circulate in the system, relay XR will deenergize if ONE's appear simultaneously in cores C31 and C37, or simultaneously in cores C30 and C34. The warning lights are thus turned on.

Additional versatility may be added to the circuit through energization of any number of the cores with radio frequency energy for the purpose of lighting miniature lamps mounted in the circuit to indicate condition of individual cores. The radio frequency signal is coupled to an unused minor aperture in the core, and the miniature lamp for that core is coupled to the same minor aperture. In such case, a lighted lamp would indicate a set core while an unlighted lamp would indicate a clear core.

Figure 8:
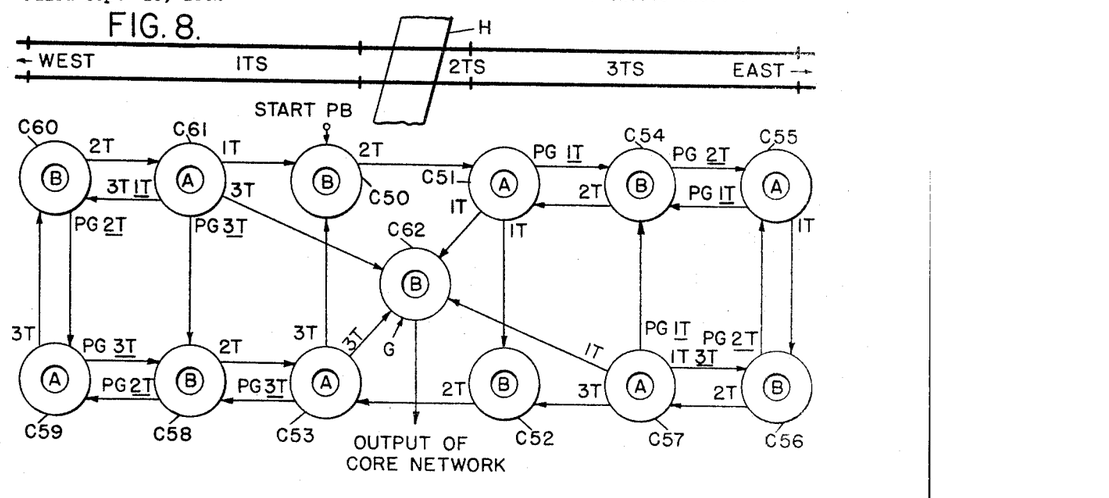
FIG. 8 is a functional diagram of the third embodiment of the highway crossing warning system for use in conjunction with D.C. track circuits.

Turning now to FIG. 8 for still another embodiment of a highway crossing system, there is shown a functional diagram of a system for use in conjunction with D.C. track circuits. The same system of notation is used with FIG. 8 as was used with FIG. 6. Thus, the symbol PG adjacent to a minor aperture indicates that a winding from prime generator PG, not shown, is wound through that minor aperture, and the symbol 1T, 2T or 3T adjacent to a minor aperture indicates that direct current from track section 1TS, 2TS or 3TS, respectively, is threaded through the associated minor aperture. If the prime signal is underlined, it indicates that the prime winding is wound in the opposite sense, tending to inhibit priming of the aperture. Hence, the symbol PG1T, for example, means that the associated aperture is primed only when signal PG is present and signal 1T is absent. Again, this system of notation is used to simplify the drawings.

Assume first, that no train is present on any of track sections 1TS, 2TS or 3TS. After a Start push button is momentarily depressed to set core C50 with a direct current pulse, a ONE circulates around a loop comprising cores C50, C51, C52 and C53. Core C62 is set on every clock A pulse and cleared on every clock B pulse. Therefore, output of the core network comprising a radio frequency signal produced from a radio frequency signal generator G occurs in the time interval following a clock A pulse and preceding a clock B pulse. The core network produces no output during the time interval following the clock B pulse and preceding the clock A pulse. Thus, output of the core network comprises periodic bursts of radio frequency energy on winding 57, as illustrated in FIG. 4. Again, it should be noted that there are no prime pulses P occurring in this embodiment as there were in the embodiment of FIG. 3, since the prime signal used in this circuit comprises a steady direct current.

Normal progress of the ONE through the core network when an eastbound train travels across the track is as follows. When the train enters track section 1TS, the current 1t circulating through track section 1ts is shunted by the train, and therefore drops. This causes core C51 to transfer the ONE upon a clock A pulse to core C54, which becomes set. The ONE is thus recirculated between cores C51 and C54 until the train enters track section 2TS. Core C62 is no longer set upon occurrence of clock A pulses; therefore, output of core C62 ceases, and the warning lights are turned on.

When the train enters track section 2TS, current 2T from track section 2TS drops. On the next clock B pulse, the ONE is transferred from core C54 to core C55, and thus the ONE is recirculated between cores C54 and C55. When the train next enters track section 3TS, no immediate effect is noted on the core network.

When the rear end of the train leaves track section 1TS, current 1T resumes flowing, and upon the next clock A pulse, the ONE is transferred from core C55 to core C56. The ONE is then recirculated between cores C56 and C55 until the rear end of the train next leaves track section 2TS.

When the train leaves track section 2TS, current 2T resumes flowing, and upon the next clock B pulse, the ONE is transferred from core C56 to core C57, setting core C57. This produces set pulses for core C62, which then resumes the periodic output which had ceased when current 1T was eliminated in the core network. The flashing warning lights are thereby extinguished. Meanwhile, the ONE is recirculated between cores C56 and C57.

When the train leaves track section 3TS, current 3T returns, and upon the next clock A pulse, core C57 transfers the ONE to core C52. Upon the next clock B pulse, the ONE is transferred from core C52 to core C53. Upon the next clock A pulse, core C62 is set from core C53, and simultaneously core C50 is set from core C53. The next clock B pulse causes core C51 to be set by core C50, and the circuit resumes its normal condition awaiting the approach of another train from either direction by circulating the ONE from core C51 to core C52, thence to core C53, thence to core C50, and so on.

If a westbound train should approach the crossing, current 3T produced by track section 3TS drops. As the ONE which is normally circulated around a closed path comprising cores C50, C51, C52 and C53 reaches core C53, core C62 cannot be set from core C53. Thus, output of the core network ceases, turning on the flashing warning lights. The ONE is transferred from core C53 to core C58, and is recirculated between cores C58 and C53 until the westbound train enters track section 2TS, causing current 2T to drop. This causes transfer of the ONE upon occurrence of the next clock B pulse, from core C58 to core C59. The ONE is then recirculated between cores C59 and C58.

When the train enters track section 1TS, no immediate effect is noted upon the core network. When the rear of the train leaves track section 3TS, current 3T resumes flowing. Upon occurrence of the next clock A pulse, the ONE is transferred from core C59 to core C60 and is recirculated between cores C59 and C60 until the rear of the train leaves track section 2TS. This causes the ONE to be transferred from core C60 to core C61 upon occurrence of the next clock B pulse following resumption of current 2T. The ONE is then recirculated between cores C60 and C61. Upon occurrence of each clock A pulse following transfer of the ONE to core C61, core C62 receives a set pulse. Thus, output of the core network is resumed and the flashing warning lights are extinguished.

When the rear of the train leaves track section 1TS, current 1T resumes flowing, and upon occurrence of the next clock A pulse following resumption of current 1T, a ONE is transferred from core C61 to core C50. The next clock B pulse transfers the ONE to core C51 from core C50, and the ONE is then circulated from core C51 to core C52, to core C53, to core C50, and so on. The circuit is now ready for another train to approach the crossing and actuate the warning lights.

Safety of this circuit may be illustrated by the following examples. If an eastbound train has crossed the highway crossing and the rear of the train has not yet left track section 3TS, the flashing warning lights are extinguished and the ONE is recirculating between cores C56 and C57. If a following train now appears on track section 1TS before the leading train has completely left track section 3TS, the ONE is transferred to core C54 from core C57 upon occurrence of the next clock A pulse. The ONE then recirculates between cores C51 and C54, and the flashing warning lights are again turned on due to cessation of core network output.

If a westbound train has crossed the highway crossing and the rear of the train has not yet left track section 1TS, the flashing warning lights are extinguished and the ONE is recirculating between cores C60 and C61. If a following train now appears on track section 3TS before the leading train has completely left track section 1TS, the ONE is transferred to core C58 from core C61 upon occurrence of the next clock A pulse. The ONE then recirculates between cores C58 and C53, and the flashing warning lights are again turned on due to cessation of output of the core network.

If an eastbound train enters track section 3TS and then backs over the crossing, the ONE is transferred from core C56 to core C55 and recirculates between cores C55 and C56. If the train, in backing up, occupies track section 1TS also, the ONE is transferred from core C55 to core C54 and recirculates between cores C54 and C55. If the train then backs off track section 2TS, the ONE is transferred to core C51 from core C54, and recirculates between cores C51 and C54. If the train then proceeds forward, the usual sequence is followed. Similar transfer of the ONE occurs if a westbound train executes a similar maneuver.

Figure 9:
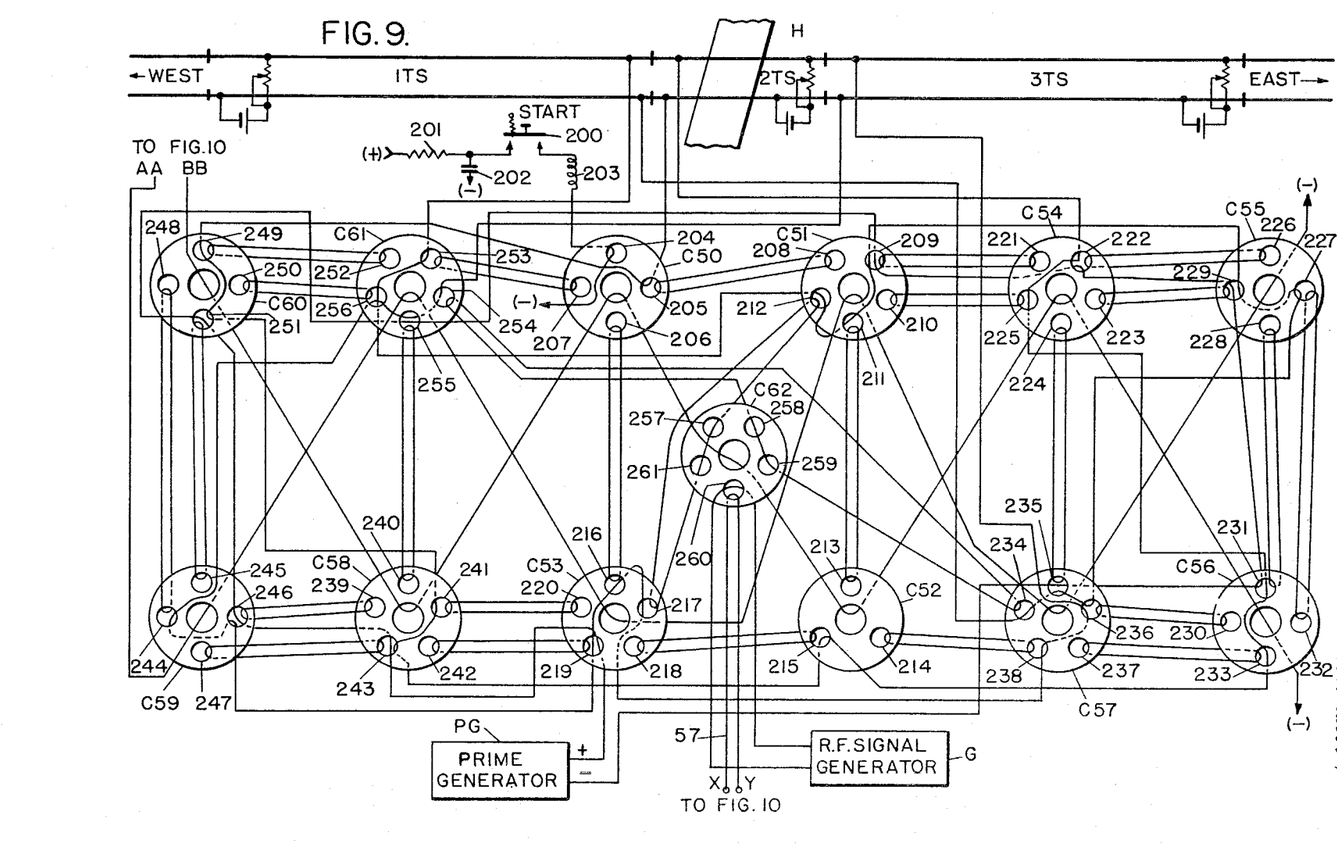
FIG. 9 is a wiring diagram of the third embodiment of the highway crossing warning system showing interconnections between the various multi-aperture cores.

Turning now to FIG. 9 for a more detailed description of the D.C. track circuit highway crossing warning system, a Start push button 200 is shown for coupling a set pulse through minor aperture 204 of core C50 from a positive source. The pulse is taken from a point common to a resistor and capacitor connected across a D.C. source. Use of resistor 201 and capacitor 202 provides a large amplitude pulse for setting core C50 when Start push button 200 is momentarily depressed, without creating a heavy current drain on the D.C. source. Conductors AA and BB for providing clock A and clock B pulses are connected to contact FR1 of flasher relay FR, shown in FIG. 10.

Addition of a radio frequency choke 203 may be desirable in the Start push button circuit in order to increase the rise time for the ONE applied to minor aperture 204 of core C50.

When Start push button 200 is momentarily depressed, a pulse of energy is conducted through minor aperture 204 of core C50 from charged capacitor 202. This pulse sets core C50. Upon application of the next clock B pulse, a set pulse is provided through minor aperture 208 of core C51 from minor aperture 205 of core C50. Upon the next clock A pulse, a set pulse is provided through minor aperture 213 of core C52 from minor aperture 211 of core C51. Upon occurrence of the next clock B pulse, a set pulse is provided through minor aperture 218 of core C53 from minor aperture 215 of core C52. Upon the next clock A pulse, a set pulse is provided through minor aperture 206 of core C50 from minor aperture 216 of core C53. When cores C51 and C53 are set, a clock A pulse produces a set pulse from minor aperture 212 of core C51 through minor aperture 257 of core C62, or from minor aperture 217 of core C53 through minor aperture 261 of core C62, depending upon whether core C51 or core C53 is set. Thus, minor apertures 212, 257, 261 and 217 are connected in an exclusive OR circuit.

Output winding 57 is connected through minor aperture 260 of core C62. Radio frequency signal generator G produces a signal which is also coupled through minor aperture 260. Thus, during the periodic intervals when core C62 is set, signal generator G provides nondestructive priming and readout pulses for the core network. These pulses are applied to relay XR of FIG. 10, thereby alternately energizing and deenergizing the relay and maintaining the flashing warning lights in the extinguished condition, as previously explained.

Now, assume an eastbound train approaches the highway crossing and enters track section 1TS. The rails in track section 1TS are thus shunted by the train, causing minor aperture 209 of core C51 to become primed by the prime generator after cessation of opposing current from track section 1TS, after core C51 is set by a pulse through minor aperture 208. The next clock A pulse causes transfer of a set pulse from minor aperture 209 of core C51 to minor aperture 221 of core C54. Occurrence of the next clock B pulse causes a set pulse to be transferred through minor aperture 210 of core C51 from minor aperture 225 of core C54, and the next clock A pulse transfers the set pulse back to core C54, and so on until the train enters track section 2TS.

Upon occurrence of the next clock B pulse following entry of the train onto track section 2TS, a set pulse is transferred to minor aperture 336 of core C55 from minor aperture 222 of core C54. Minor aperture 225 of core C54 is no longer primed, due to loss of current from track section 2TS. Upon occurrence of the clock A pulse following transfer of the set pulse to core C55, a set pulse is recirculated back to core C54 through minor aperture 223 from minor aperture 229 of core C55 which is primed by the prime generator due to loss of opposing current from track section 1TS. The next clock B pulse causes recirculation of the set pulse back to core C55, and so on, until the rear end of the train leaves track section 1TS.

Upon occurrence of the next clock A pulse following exit of the train from track section 1TS, a set pulse is transferred to minor aperture 232 of core C56 from minor aperture 227 of core C55, since minor aperture 227 becomes primed by current from track section 1TS when the train leaves track section 1TS. When core C56 is set, a clock B pulse transfers a set pulse from minor aperture 231 of core C56 to minor aperture 228 of core C55, and upon occurrence of the next clock A pulse, core C55 sets core C56, and so on. It should be noted, however, that in order for a minor aperture in a core to be primed, the core must first be set.

When the train enters track section 3TS minor aperture 236 of core C57 is primed by current from track section 1TS, due to loss of opposing current from track section 3TS. Then, when the rear of the train leaves track section 2TS, minor aperture 233 of core C56 is primed by current from track section 2TS. Thus, a clock B pulse transfers a set pulse from minor aperture 233 to minor aperture 237 of core C57, and the next clock A pulse transfers a set pulse from minor aperture 236 to minor aperture 230 of core C56. The next clock B pulse transfers the set pulse back to core C57, and so on. In addition, with every clock A pulse a set pulse is produced from minor aperture 234 of core C57, which sets core C62 through minor aperture 259. Thus, when the rear of the train has left track section 2TS, core C62 is set by every clock A pulse, so that an output appears on winding 57. This extinguishes the flashing warning lights.

When the rear of the train leaves track section 3TS minor aperture 236 loses its prime due to flow of an inhibiting current from track section 3TS, and minor aperture 238 of core C57 becomes primed by the current from track section 3TS. Thus, upon the next clock A pulse, a set pulse is provided through minor aperture 214 of core C52 from minor aperture 238. The next clock B pulse produces a set pulse through minor aperture 218 of core C53 from minor aperture 215 of core C52. The next clock A pulse produces a set pulse through minor aperture 206 of core C50 from minor aperture 216 of core C53, and also produces a set pulse through minor aperture 261 of core C62 from minor aperture 217 of core C53, thereby maintaining the warning lights extinguished. The next clock B pulse transfers a set pulse to core C51, and a set pulse is thereafter transferred to core C52, and so on, until the next train approaches the highway crossing.

In the case of a westbound train, when the train enters track section 3TS, a pulse is transferred from minor aperture 219 of core C53, thereby setting core C58 through minor aperture 242. Since minor aperture 217 loses its prime due to loss of current from track section 3TS, when the circulating ONE reaches core C53, no set pulse is produced through minor aperture 261 of core C62, and therefore core C62 is no longer periodically set. No further output is thereby produced from minor aperture 260, and the flashing warning lights are thereby turned on. The ONE is recirculated from minor aperture 241 of core C58 a minor aperture 220 of core C53, and so on, until the train enters track section 2TS.

When the train enters track section 2TS, minor aperture 241 loses its prime due to loss of current from track section 2TS, and minor aperture 243 of core C58 becomes primed by the prime generator due to absence of opposing current from track section 2TS. Upon occurrence of the next clock B pulse, the ONE is transferred from minor aperture 243 of core C58, which is primed by the prime generator due to absence of opposing current from track section 2TS, to minor aperture 247 of core C59. Upon occurrence of the next clock A pulse, a set pulse is transferred to minor aperture 239 of core C58 from minor aperture 246 of core C59 which became primed by the prime generator when the train shunted the rails of track section 3TS, eliminating opposing current from track section 3TS.

When the train enters track section 1TS, no immediate effect is noted on the core network.

When the rear end of the train leaves track section 3TS, minor aperture 244 of core C59 becomes primed and minor aperture 246 of core C59 loses its prime, due to resumption of current from track section 3TS. Upon the next clock A pulse, a set pulse is transferred to minor aperture 248 of core C60 from minor aperture 244. Upon occurrence of the next clock B pulse, a set pulse is transferred to minor aperture 254 of core C59 from minor aperture 251 of core C60. The next clock A pulse transfers a set pulse back to core C60, and so on, until the rear of the train leaves track section 2TS.

When the train leaves track section 2TS, minor aperture 249 of core C60 becomes primed and minor aperture 251 of core C60 loses its prime, due to resumption of current flow from track section 2TS. Upon the next clock B pulse, a set pulse is transferred from minor aperture 249 of core C60 to minor aperture 252 of core C61, and upon occurrence of the next clock A pulse, a set pulse is transferred from minor aperture 256 of core C61 back to core C60 through minor aperture 250. The next clock B pulse causes a set pulse to be transferred from core C60 to core C61, and so on. Moreover, each time core C61 is cleared subsequent to being set, it produces a set pulse through minor aperture 258 of core C62 from minor aperture 254 which receives a steady prime signal from track section 3TS when that track section is unoccupied. It should here be noted that minor apertures 254, 257, 259 and 234 are connected in an exclusive OR circuit.

Upon setting of core C62 periodic bursts of radio frequency energy appear on output winding 57, and relay XR is alternately energized and deenergized. As previously explained, this periodic energization and deenergization of relay XR extinguishes the warning lights.

When the rear of the train leaves track section 1TS, minor aperture 256 loses its prime and minor aperture 253 of core C61 becomes primed due to resumption of current flow from track section 1TS. Upon occurrence of the next clock A pulse, a set pulse is transferred to minor aperture 207 of core C50 from minor aperture 253. The next clock B pulse then causes a set pulse to be produced through minor aperture 208 of core C51 from minor aperture 205 of core C50. The next clock A pulse causes setting of core C62 through minor aperture 257 from minor aperture 212 of core C51 and causes setting of core C52 through minor aperture 213 from minor aperture 211 of core C51. Thus, a set pulse is transferred from core C50 to core C51, to core C52, then to core C53, and so on, until the next train approaches the highway crossing from either direction.

Because core C62 is set only through exclusive OR circuits, protection is obtained against an abnormal condition such as might be caused by lightning, wherein an extra ONE appears in the system. Thus, relay XR will deenergize if ONE's appear simultaneously in cores C51 and C53, or simultaneously in cores C61 and C57. The warning lights are thus turned on.

Referring now to FIG. 10 for a more detailed description of operation of the warning lights, output pulses from the core network output winding 57 of FIG. 9 or FIG. 7 are applied to relay XR through half-wave rectifier 59. Capacitor 58 is connected across the relay in order to smooth the core network output pulses and thereby maintain the relay energized for substantially as long as a signal is applied across the terminals XY from the XY terminals of either FIG. 7 or FIG. 9. The XR relay in turn controls circuits to the flashing warning lights at the crossing. In a steady deenergized or energized condition, the relay actuates the flashing lights.

When relay XR is energized, relay XRP is energized from capacitor 197. While relay XR is energized, capacitor 196 acquires a charge. Then, when relay XR next deenergizes, back contacts XRL and XR2 of relay XR provide a discharge path for capacitor 196 through relay XRP and resistor 195 in series. Thus, relay XRP remains energized. When relay XR next reenergizes, front contacts XR1 and XR2 of relay XR again permit charging of capacitor 196 directly from the positive source and energization of relay XRP from capacitor 197. Capacitor 197 is connected in parallel with relay XRP to provide energy storage during the interval in which relay XR is deenergized and capacitor 196 is providing energization for relay XRP. Thus, when relay XR again energizes, the energy stored on capacitor 197 maintains relay XRP in the energized condition. Should capacitor 197 lose its charge, relay XRP will deenergize. Thus, in order for relay XRP to remain energized, relay XR must continue to move. If relay XR should remain in the energized condition, capacitor 197 loses its charge through relay XRP, and therefore relay XRP deenergizes. On the other hand, should relay XR remain deenergized, capacitor 196 loses its charge through relay XRP resulting in deenergization of relay XRP.

Deenergization of relay XRP provides energization for flashing lights 198 from a positive source through back contact XRP1. Thus, relay XR must periodically energize and deenergize in order to keep flashing lights 198 turned off.

Flashing of the warning lights is due to constant motion of flasher relay FR. This motion is produced by energization of relay FR from free-running multivibrator 194.

The circuit of FIG. 10 provides clock A and clock B pulses for the circuit of FIGS. 6 and 7, and the circuit of FIGS. 8 and 9. These clock pulses are produced from contact FR1 of flasher relay FR. Contact FR1 is energized from a point common to resistor 105 and capacitor 106 connected across a D.C. supply. During the interval in which contact FR1 is travelling between its front and back contact, capacitor 106 charges from the D.C. supply through resistor 105. When either front or back FR1 contact is closed, capacitor 106 provides a burst of energy for the clock pulse. This helps provide properly shaped clock pulses.

A pair of radio frequency chokes 108 and 109 are inserted in the clock A and clock B leads to help shape the clock A and clock B pulses by providing increased rise times. The terminals AA are connected to the terminals AA in FIG. 7 or FIG. 9 in order to provide the clock A pulses for the desired embodiment, and the terminals BB are connected to the terminals BB of FIG. 7 or FIG. 9 in order to provide the clock B pulses for the desired embodiment. This circuit therefore provides a convenient and readily available source of clock A and clock B pulses, due to the fact that the flasher relay is constantly in operation even when no trains are present on the track and the warning lights turned off.

Failure of flasher relay FR causes cessation of clock A and clock B pulses in the embodiments of FIGS. 7 and 9. As previously explained, such cesation produces either steady energization or steady deenergization of relay XR, which in turn causes deenergization of relay XRP. This causes steady energization of half the warning lights, adding to the fail-safe features of the circuit. Which half of the warning lights energizes depends upon whether relay FR, upon failure, remains in its energized or deenergized condition.

Thus, there has been shown a system for actuating highway crossing warning lights when a train approaches the crossing on a signal track from either direction, through a multi-aperture ferrite core network. The system utilizes a minimum number of relays in combination with solid state passive devices for performing the logic functions. The highway crossing protection system utilizes multi-aperture ferrite cores in conjunction with overlay track circuits or D.C. track circuits, and unusual sequences of train operation at the highway crossing will not falsely cause the warning lights to be turned off.

Although several specific embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention. For example, although the cores utilized in the invention are represented in the drawings as having single turn windings, the invention is not to be taken as limited thereto; any suitable number of turns may be used in order to achieve proper switching of the cores, depending upon such design factors as physical size of the cores and amplitudes of current.

What I claim is:

1. A highway crossing protection system comprising means for generating a plurality of signals indicative of the presence of a train on either side of a highway crossing, a network of ferrite cores, means utilizing the signals as priming currents for the network, means coupling a pair of clock generators to said network to provide signals for reading out pulses from the network, and relay means coupled to the output of the network for actuating warning means at the highway crossing upon deenergization, said relay means deenergizing upon the approach of a train at the highway crossing.

2. A highway crossing protection system comprising means for generating a pair of signals indicative of the presence of a train on either side of a highway crossing, a network comprising a plurality of multi-aperture ferrite cores, means utilizing the signals as priming currents for the network, means coupling a pair of clock generators to said network to provide signals for reading out pulses from the network, and relay means coupled to the output of the network for actuating warning means at the highway crossing upon deenergization, said relay means deenergizing upon loss of any one of the signals and reenergizing upon resumption of said one of the signals.

3. A highway crossing protection system comprising means for generating a trio of signals indicative of the presence of a train on either side of a highway crossing, a network comprising a plurality of cores displaying a square hysteresis loop characteristic, means utilizing the signals as priming signals for the network, means coupling a pair of clock generators to the network to provide signals for reading out pulses from the network, and relay means coupled to the network for actuating warning means at the crossing upon deenergization, said relay means deenergizing upon loss of any one of the signals and reenergizing upon resumption of said one of the signals.

4. A highway crossing protection system comprising a pair of transmitters located at some distance from a highway crossing on either side of the crossing and applying signals of different frequencies to a railroad track, a pair of receivers coupled to the railroad track close to and on either side of the highway crossing, each receiver tuned to receive only the frequency produced by the transmitter on the opposite side of the highway crossing, a network of multi-aperture ferrite cores receiving the output of both receivers, a trio of pulse generators coupled to the network and applying signals of identical frequency but different phase to the network, a relay coupled to the network and energized at least when the network receives signals from both receivers and the trio of pulse generators, said relay connected to actuate highway crossing warning means upon deenergization.

5. A highway crossing protection system comprising a pair of transmitters located at some distance from a highway crossing on either side of the crossing and applying signals of different frequencies to a railroad track, a pair of receivers coupled to the railroad track close to and on either side of the highway crossing, each receiver tuned to receive only the frequency produced by the transmitter on the opposite side of the highway crossing, a network of multi-aperture ferrite cores receiving the output of both receivers, a pair of pulse generators coupled to the network for clearing the cores, a prime generator coupled to the network and applying a D.C. priming signal to the cores, a relay coupled to the network and energized at least when the network receives signals from both receivers, the pair of pulse generators, and the prime generator, said relay connected to actuate highway crossing warning means upon deenergization.

6. A highway crossing protection system comprising three track sections, a source of current applied to one end of each of the sections, a network of multi-aperture ferrite cores, means coupling the currents from the other ends of the track sections to minor apertures of the cores in the multi-aperture core network, flashing warning lights including a periodically energized and deenergized relay, means coupling a pair of clock pulses produced by the relay through major apertures of the multi-aperture cores, and second relay means coupled to the output of the network for actuating the warning lights located at the highway crossing upon deenergization, said second relay means deenergizing upon loss of any one of the currents and reenergizing upon resumption of said one of the currents.

7. In a highway crossing protection system having means for generating at least a pair of signals indicative of the presence of a train on either side of a highway crossing, a recirculating circuit comprising a pair of multi-aperture ferrite cores, means utilizing the signals as priming signals for the cores, means coupling a pair of clock generators to said cores to provide signals for reading out pulses from each core, means magnetically coupling a pair of minor apertures of one core to a pair of minor apertures of the other core, means initially setting one of the cores, and means for reading out a signal from a third aperture in either core upon loss of one of the signals indicative of the presence of a train.

8. In a highway crossing protection system utilizing a network of multi-aperture cores having a plurality of inputs controlled by the presence of trains near the crossing and warning means operated at times from a continuously energizing and deenergizing flashing relay, means for assuring fail-safe operation of the core network comprising, means continuously generating pulses from the flasher relay, means coupling the pulses through the major aperture of each of the cores, an output relay, means including the network of cores periodically energizing and deenergizing the output relay provided that the highway crossing is unoccupied and no train is approaching, a warning control relay for selecting operation of the warning means when deenergized, and means sensing the periodic energization and deenergization of the output relay for maintaining the warning control relay energized when and only when the output relay is periodically energized and deenergized.

9. In a highway crossing protection system having means for producing signals indicative of the presence of a train on either side of a highway crossing, a network of multi-aperture ferrite cores, means setting first and second cores, means priming the first core by one of the signals, means priming the second core by the other of the signals, means coupling the first core to a third core, means coupling the second core to a fourth core, means clearing the first and second cores thereby setting third and fourth cores respectively, means coupling the fourth core to the third core, means priming the third and fourth cores, said means setting first and second cores subsequently clearing the fourth core thereby clearing the third core, and means setting a fifth core from the third core, thereby producing an output signal for controlling protective warning means at the crossing.

10. A highway crossing protection system comprising means sensing approach, presence and departure of a train on a track, a multi-aperture ferrite core, means coupling the sensing means to the core and periodically setting the core with pulses when the track is unoccupied by an approaching or present train, means coupling periodic clear pulses to the core, one clear pulse occurring after each set pulse, relay means coupled to the core, means coupling a radio frequency signal to the core for energizing the relay means when and only when the core is set, and warning means coupled to the relay means and actuated when the relay means remains deenergized during intervals following each setting pulse and preceding each clearing pulse.

11. A highway crossing protection system comprising means responsive to presence of a train along a track, a network of multi-aperture ferrite cores, means coupling the responsive means to the network for sequentially priming minor apertures of cores in the network in correspondence with location of the train along the track, first pulse generating means periodically clearing a first group of cores in the network at a predetermined repetition rate and at predetermined times, second pulse generating means periodically clearing a second group of cores in the network at said predetermined repetition rate but at other than said predetermined times, and means responsive to the progression of primed apertures for actuating warning means at the crossing when the train is blocking or about to block the highway.

12. A highway crossing protection system comprising means for generating a plurality of signals indicative of presence of a train on either side of a highway crossing, a network of multi-aperture cores, means coupling the signals to the network of multi-aperture cores, means interconnecting the cores of said network so as to selectively alter the remanent magnetic states of either one of two groups of said cores in accordance with the signals, circuit means coupled to said network and producing output energy in response to the remanent magnetic states of said groups of cores, and means responsive to the output of said last-named means for controlling highway crossing warning means.

13. A highway crossing protection system comprising means for generating a plurality of signals indicative of presence of a train on either side of a highway crossing, a network of multi-aperture cores, means coupling the signals to the network of multi-aperture cores, means interconnecting the cores of said network so as to selectively alter the remanent magnetic state of either one of two cores in accordance with the signals, circuit means coupled to said network and producing output energy in accordance with the remanent magnetic states of said two cores, and means responsive to the output of said last-named means for controlling highway crossing warning means located at the crossing.

14. A highway crossing protection system comprising a pair of signal generators located at some distance from a highway crossing on either side of the crossing, each generator applying a signal of different frequency to a railroad track, a pair of receivers coupled to the railroad track close to and on either side of the highway crossing, each receiver tuned to receive only the frequency produced by the signal generator on the opposite side of the highway crossing, a multi-aperture ferrite core network receiving output signals of both receivers, means interconnecting the cores of said network so as to selectively alter the remanent magnetic states of either one of two groups of said cores in accordance with the receiver output signals, circuit means coupled to said network and producing output energy in response to the remanent magnetic states of said groups of cores, and a relay responsive to the output of said last-named means and connected to actuate highway crossing warning means upon deenergization, said relay deenergizing upon loss of a first receiver output signal, remaining deenergized upon loss of the second receiver output signal, and thereafter reenergizing upon resumption of the first receiver output signal.

15. A highway crossing protection system comprising a pair of signal generators located at some distance from a highway crossing on either side of the crossing, each generator applying a signal of different frequency to a railroad track, a pair of receivers coupled to the railroad track close to and on either side of the highway crossing, each receiver tuned to receive only the frequency produced by the signal generator on the opposite side of the highway crossing, a multi-aperture ferrite core network receiving output signals of both receivers, means interconnecting the cores of said network so as to selectively alter the remanent magnetic state of either one of two cores in accordance with the receiver output signals, circuit means including another core of the network producing output energy from said network in accordance with the remanent magnetic states of said two cores, and a relay responsive to the output energy of said circuit means and connected to actuate highway crossing warning means upon deenergization, said relay deenergizing upon loss of a first receiver output signal, remaining deenergized upon loss of the second receiver output signal, and thereafter reenergizing upon resumption of the first receiver output signal.

16. In a highway crossing protection system for controlling warning means at the crossing, means for generating first and second signals in accordance with the sensing of the absence of trains in respective areas near the crossing, first and second multi-aperture ferrite cores, means coupling the first signal through first and second apertures in the first core, means coupling the second signal through first and second apertures in the second core, means coupling clear pulses through third apertures in each of the cores, means magnetically coupling the second apertures of the first and second cores to fourth apertures of the second and first cores respectively, means initially setting said first core, and readout means coupled to the first aperture of either core for reading out a signal from said either core upon loss of the signal coupled thereto.

17. The highway crossing protection system of claim 16 wherein said means coupling clear pulses through third apertures in each of the cores comprises first pulse generating means coupled to said first core and second pulse generating means coupled to said second core, said first pulse generating means producing pulses out-of-phase with the pulses produced by the second pulse generating means.

18. In a highway crossing protection system comprising three track sections and a source of direct current applied to each of the sections, a plurality of multi-aperture ferrite cores, means coupling the current from the track section on one side of the crossing through minor apertures of a first one of the cores for priming the first core, means coupling the current from the track section on the other side of the crossing through minor apertures of a second one of the cores for priming the second core, means coupling the current from the center track section through minor apertures of third and fourth ones of the cores for priming the third and fourth cores, first pulse generating means coupling clock pulses of constant phase through the major apertures of said first and second cores, second pulse generating means coupling clock pulses of phase different from those generated by the first pulse generating means through the major apertures of said third and fourth cores, and means coupling an output pulse from either the first or second core upon failure of a priming signal coupled to said first or second core respectively.

19. The system of claim 18 wherein said first and second pulse generating means operate at identical repetition rates.

20. In a highway crossing protection system having means for indicating presence of a train on a track at a highway crossing, the combination comprising first and second track sections receiving continuous energization, a network of multi-aperture ferrite cores, first means coupling energy from the first track section to a first core in the network, second means coupling energy from the second track section to a second core in the network, said first and second coupling means adapted to be short-circuited by presence of a train on the associated track section, means initially setting the first core, first means responsive to energy from the first track section for coupling a set pulse from the first core to the second core, second means responsive to energy from the first track section for coupling a set pulse from the first core to an output core, means responsive to energy from the second track section for coupling a set pulse from the second core to the first core, and means interconnecting the remaining cores in the network with said first and second cores whereby preselected ones of the remaining cores are set sequentially according to the order in which progress of the train along the track short-circuits energy coupled to the network from the track sections and subsequently permits reapplication of energy to the network from the track sections, said output core providing an output signal for actuating the indicating means when said first and second cores are in a clear condition.

21. In a highway crossing protection system having means for indicating presence of a train on a track at a highway crossing, the combination comprising first, second and third track sections, each said track section receiving constant energization, a network of multi-aperture ferrite cores, first means coupling energy from the first track section to a first core in the network, second means coupling energy from the second track section to a second core in the network, third means coupling energy from the third track section to third and fourth cores in the network, each said coupling means adapted to be short-circuited by presence of a train on the associated track section, means initially setting the fourth core, means interconnecting the fourth core in series with the first, third and second cores whereby said first, third, second and fourth cores are sequentially set in response to energy received from the three track sections, an output core, means responsive to energy received from the three track sections for coupling set pulses from the first and second cores to the output core, and means interconnecting the remaining cores in the network with the first, third, second and fourth cores whereby preselected ones of said remaining cores are set sequentially according to the order in which progress of the train along the track short-circuits energy coupled to the network from the track sections and subsequently permits reapplication of energy to the network from the track sections, said output core providing an output signal for actuating the indicating means when the first and second cores are in a clear condition.

22. A highway crossing protection system comprising means for generating a trio of signals indicative of presence of a train on either side of a highway crossing, a network comprising a plurality of cores displaying a square hysteresis loop characteristic, means utilizing the signals as priming signals for the network, means coupling a pair of clock generators to the network to provide signals for reading out pulses from the network, warning means, and switching means coupled to the output of the network for actuating the warning means, said switching means energizing the warning means upon loss of any one of the signals and deenergizing the warning means upon resumption of said one of the signals.

23. A highway crossing protection system comprising three track sections, a source of current applied to one end of each of the sections, a network of multi-aperture ferrite cores, means coupling the current from the other ends of the track sections to minor apertures of the cores in the multi-aperture core network, warning means including a periodically energized and deenergized relay, means coupling a pair of clock pulses produced by the relay through major apertures of the multi-aperture cores, and second relay means coupled to the output of the network for actuating the warning means upon steady energization and upon steady deenergization, said second relay means being periodically energized and deenergized only during presence of all said currents.

References Cited by the Examiner

UNITED STATES PATENTS

| | | | |
|---|---|---|---|
| 2,452,868 | 11/1948 | Quinlan | 246—125 |
| 2,802,953 | 8/1957 | Arsenault et al. | 307—88 |
| 2,852,665 | 9/1958 | Kemmerer | 246—126 |
| 2,915,623 | 12/1959 | Hughson | 246—63 X |
| 2,966,664 | 12/1960 | Lamy | 307—88 X |
| 2,968,795 | 1/1961 | Briggs et al. | 340—174 |
| 2,983,906 | 5/1961 | Crane | 340—174 |
| 3,004,245 | 10/1961 | Crane et al. | 340—174 |
| 3,035,167 | 5/1962 | Luft | 246—130 |
| 3,044,044 | 7/1962 | Lee | 340—174 |
| 3,046,392 | 7/1962 | Luft | 246—130 |
| 3,056,116 | 9/1962 | Crane | 340—174 |

OTHER REFERENCES

Railway Signaling and Communications, September 1960; pp. 19–23 and 48; published by Simmons Boardman, New York.

ARTHUR L. LA POINT, *Primary Examiner*.

LEO QUACKENBUSH, *Examiner*.

S. B. GREEN, *Assistant Examiner*.